No. 686,798. Patented Nov. 19, 1901.
G. H. BALENTINE.
AIR BRAKE COUPLING.
(Application filed Aug. 21, 1901.)
(No Model.)
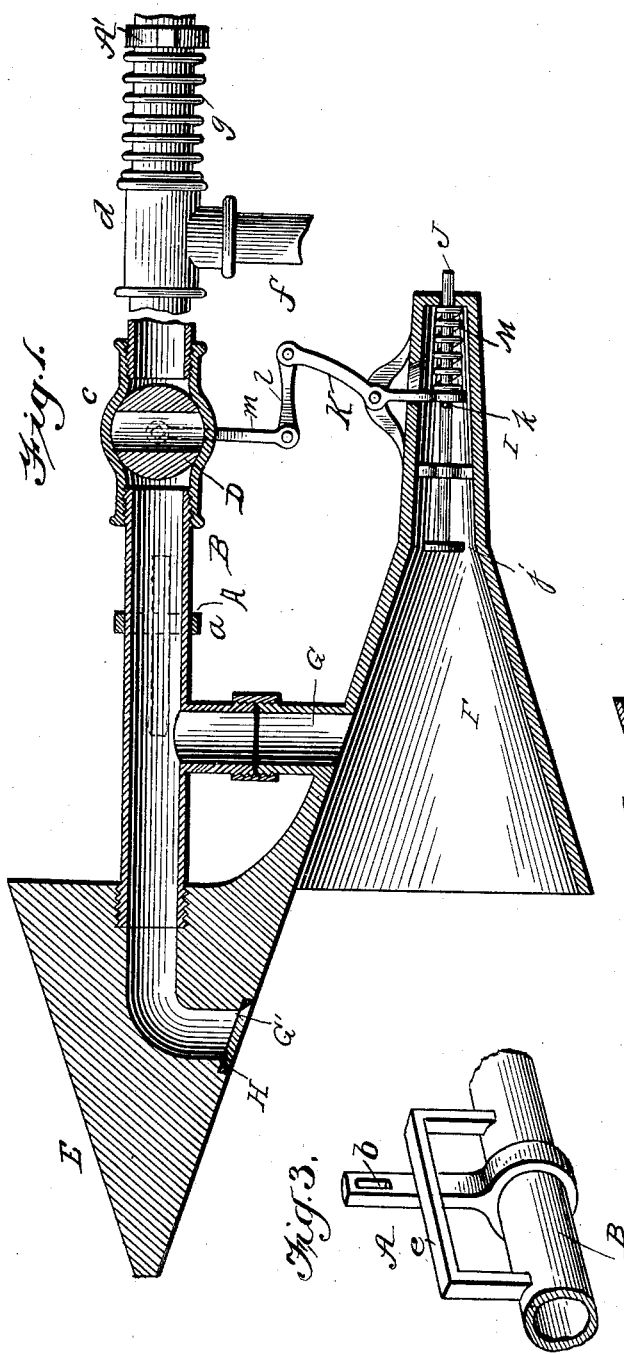
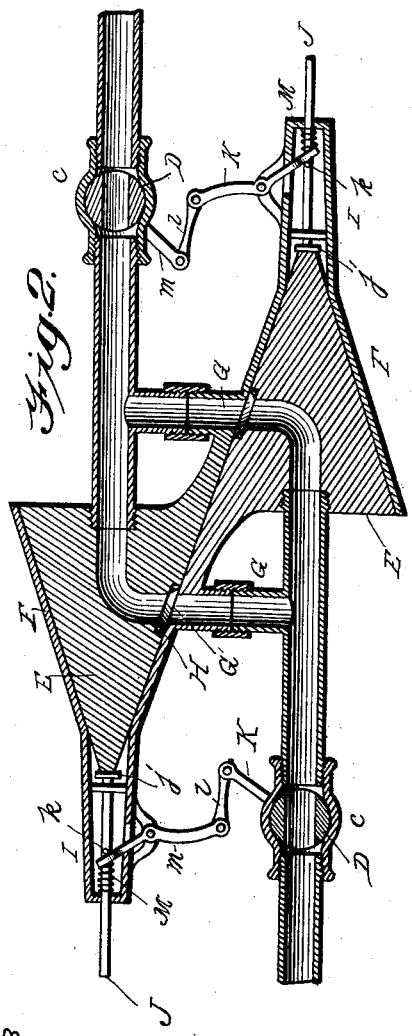
Witnesses
H. G. Dieterich
N. C. Healy
Inventor
George H. Balentine
By James J. Sheehy
Attorney

UNITED STATES PATENT OFFICE.

GEORGE H. BALENTINE, OF LAURENS, SOUTH CAROLINA.

AIR-BRAKE COUPLING.

SPECIFICATION forming part of Letters Patent No. 686,798, dated November 19, 1901.

Application filed August 21, 1901. Serial No. 72,730. (No model.)

*To all whom it may concern:*

Be it known that I, GEORGE H. BALENTINE, a citizen of the United States, residing at Laurens, in the county of Laurens and State of South Carolina, have invented new and useful Improvements in Air-Brake Couplings, of which the following is a specification.

My invention relates to improvements in air-brake couplings; and it contemplates the provision of a simple and reliable coupling which is calculated to automatically connect and establish communication between the air-brake pipes on two cars when the same come together and is also calculated when the cars are uncoupled and separated to automatically close the pipes, and thereby prevent the escape of air therefrom.

Other advantageous features of the invention will be fully understood from the following description and claims, when taken in conjunction with the accompanying drawings, in which—

Figure 1 is a horizontal section of one of my improved couplers in its proper operative position. Fig. 2 is a similar view illustrating two complementary couplers as connecting the air-brake pipes of two cars and effecting communication between said pipes, and Fig. 3 is a detail view of the forward hanger.

Similar letters of reference designate corresponding parts in all of the views of the drawings.

My improved couplers are similar in all respects, and consequently a detailed description of the one shown in Figs. 1 and 3 will suffice to impart an understanding of both.

Referring, therefore, more particularly to Figs. 1 and 3, A A' are hangers, which have rings $a$ and slots $b$, the latter to receive cross-rods (not shown) of a less size than themselves at the under side of a car-body, so as to permit the hangers to move both laterally and vertically on said cross-rods, and B is a pipe arranged and movable endwise in the rings of the hangers and having a valve-casing $c$ and a T-coupling $d$ at intermediate points of its length and also having a radial projection $e$, arranged to engage the forward hanger A, and thereby prevent turning of the pipe on its axis. The casing $c$ receives a rocking valve D, presently described, and the T-coupling $d$ is for the connection of a hose $f$, designed for use when it is desired to connect my improved coupler to an ordinary air-brake coupler on another car. Said T-coupling also forms an abutment for one end of a coiled spring $g$, which bears at its other end against the rear hanger A' and has for its purpose to normally hold the pipe B in the position shown and cushion said pipe when the same is forced rearwardly, as will be presently described. The rear end of the pipe B is designed to be connected by a hose (not shown) with the air-brake pipe (also not shown) of a car, this in order to permit of the before-mentioned endwise movement of said pipe B.

E is a cone-shaped head which is secured on the forward end of the pipe B, and F is a cone-shaped socket which is connected to or formed integral with said head E and is arranged at the side of the pipe B and connected to the same through the medium of a lateral branch pipe G. The head E is designed to take into the socket F of a coupler complementary to that shown in Fig. 1 and is provided with a passage G', which communicates with and extends forwardly from the pipe B and thence laterally to the side of the head, where it is provided with a gasket H. When the head E takes into the socket F of a complementary coupler incident to the bringing of two cars together, the passage G' registers with the pipe G on said socket to effect communication between the couplers, and the gasket H, which normally extends a slight distance beyond the side of the head, bears against the wall of the socket and renders the connection between the couplers air-tight.

The socket F terminates at its inner end in a reduced portion I, and in said reduced portion is guided a rod J, movable in the direction of the length of the socket. Said rod has a head $j$ at its forward end for the engagement of the end of a head E of a complementary coupler and is provided at an intermediate point of its length with an enlargement $k$, the latter to engage a lever K, fulcrumed on the socket portion I and connected by a link $l$ to a crank $m$ on the stem of the valve D. Surrounding the rod J and interposed between the lever K and the rear end of the socket portion I is a coiled spring M, which operates to return the rod J and the valve D to the positions shown when the rod is relieved of pressure and normally holds the rod and valves in said positions.

In practice when two cars equipped with my improved couplers are brought end to end together the cone-shaped head E of each coupler will take into the socket F of the complementary coupler on the other car after the manner shown in Fig. 2 and by so doing will engage and move the rods J in an endwise direction to open the valves D and at the same time cause the passages G' in the heads E to register with the pipes G between the pipes B and the sockets F. Thus an automatic connection will be effected and communication established between the pipes on the two cars to permit air to pass from one to the other.

When the cars are uncoupled and drawn apart, my improved complementary couplers will be drawn out of engagement with each other, when the springs M, operating against the levers K, will immediately close the valves D, and thereby effectually prevent the escape of air from the air-brake pipes.

While the couplers are in engagement with each other the cushion-springs g will operate at all times to crowd the cone-shaped heads E into the complementary sockets F, and thereby render the connection perfectly air-tight.

It will be appreciated from the foregoing that my improved coupling is simple and inexpensive in construction, reliable in its automatic operation, and embodies no delicate parts such as are liable to get out of order after a short period of use.

Having described my invention, what I claim, and desire to secure by Letters Patent, is—

1. In an air-brake coupling, the combination of a pipe adapted to be connected with the air-brake pipe on a car, a rocking valve arranged in said pipe and having a crank, a cone-shaped head arranged at the end of the pipe and having a passage leading from the same to its side, a cone-shaped socket fixed with respect to the pipe and head thereon and having the reduced inner portion and one or more guides therein, a conduit connecting the pipe and the interior of the cone-shaped socket, a rod arranged in the guide or guides of the inner portion of the socket in a position to be engaged and moved endwise by the head of a complementary coupler when the same enters the socket, and a lever connected with the crank of the rocking valve and arranged to be engaged and moved by the said rod.

2. In an air-brake coupling, the combination of hangers adapted to be connected with a car-body, a pipe movable endwise in said hangers, and provided with a valve, and also with a T-coupling carrying a hose, a spring interposed between one of the hangers and an abutment on the pipe, a cone-shaped head arranged at the end of the pipe and having a passage leading from the same to its side, and also having a gasket surrounding the outer end of said passage, a cone-shaped socket fixed with respect to the pipe and head thereon, and having an inner reduced portion, a passage connecting the pipe and the interior of the cone-shaped socket, an endwise-movable rod arranged in the inner reduced portion of the socket, and having an enlargement, a lever fulcrumed on said socket portion and connected with the valve and arranged to be engaged by the enlargement of the rod, and a spring surrounding the rod and interposed between the lever and the end of the reduced portion of the socket.

In testimony whereof I have hereunto set my hand in presence of two subscribing witnesses.

GEORGE H. BALENTINE.

Witnesses:
W. R. RICHEY,
L. J. STIFF.